United States Patent
Weber et al.

(10) Patent No.: US 8,111,813 B2
(45) Date of Patent: Feb. 7, 2012

(54) UNIFIED GREETING SERVICE FOR TELECOMMUNICATIONS EVENTS

(75) Inventors: Gregory D. Weber, Westminster, CO (US); David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 494 days.

(21) Appl. No.: 12/241,949

(22) Filed: Sep. 30, 2008

(65) Prior Publication Data
US 2010/0080362 A1    Apr. 1, 2010

(51) Int. Cl.
*H04M 11/00* (2006.01)
(52) U.S. Cl. ............ 379/88.14; 379/76; 379/88.22
(58) Field of Classification Search .......... 379/67.1, 379/76, 88.14, 88.13, 88.22, 88.23
See application file for complete search history.

(56) References Cited

U.S. PATENT DOCUMENTS

| | | | | |
|---|---|---|---|---|
| 5,434,908 A * | 7/1995 | Klein | | 379/88.23 |
| 5,832,062 A * | 11/1998 | Drake | | 379/88.16 |
| 6,104,788 A * | 8/2000 | Shaffer et al. | | 379/93.17 |
| 6,580,787 B1 * | 6/2003 | Akhteruzzaman et al. | | 379/88.22 |
| 6,640,230 B1 * | 10/2003 | Alexander et al. | | 1/1 |
| 7,054,918 B2 * | 5/2006 | Polcyn | | 709/217 |
| 7,099,656 B2 * | 8/2006 | Chefalas et al. | | 455/412.1 |
| 2002/0025026 A1 | 2/2002 | Gerszberg et al. | | |
| 2002/0090069 A1 * | 7/2002 | Yaker | | 379/88.17 |
| 2004/0156484 A1 * | 8/2004 | Amin | | 379/88.14 |
| 2004/0198427 A1 * | 10/2004 | Kimbell et al. | | 455/556.1 |
| 2006/0072715 A1 * | 4/2006 | Michael et al. | | 379/88.12 |
| 2007/0003028 A1 * | 1/2007 | Korah et al. | | 379/88.14 |
| 2007/0263791 A1 | 11/2007 | Alperin et al. | | |
| 2008/0253538 A1 * | 10/2008 | Lennartsson | | 379/88.18 |

FOREIGN PATENT DOCUMENTS

| | | |
|---|---|---|
| GB | 2420246 A | 5/2006 |
| WO | 2004082244 A3 | 9/2004 |

OTHER PUBLICATIONS

Morris, Euros, "GB Application No. GB0913600.3 Search Report Nov. 11, 2009", , Publisher: UK IPO, Published in: GB.

* cited by examiner

*Primary Examiner* — Olisa Anwah
(74) *Attorney, Agent, or Firm* — Sheridan Ross P.C.

(57) ABSTRACT

A technique is disclosed that enables a telecommunications user to initially enter a greeting message in a single media format such as either voice or text. Subsequently, this greeting message is used by a server in response to any communication event that arrives for the user, such as a voice call or an email message, regardless of the media format of the arriving communication event. When the server receives arrival notifications of various communication events, it generates a customized greeting message in response to that event and in the same media format as the event itself. In other words, the server represents a previously-prepared outgoing voice or text message i) as a voice message in response to an incoming voice call and ii) as a textual message in response to an email, SMS text message, or instant message.

17 Claims, 5 Drawing Sheets

UNIFIED GREETING SERVICE FOR TELECOMMUNICATIONS EVENTS

FIELD OF THE INVENTION

The present invention relates to telecommunications in general, and, more particularly, to a unified greeting service for telecommunication events such as voice calls and email.

BACKGROUND OF THE INVENTION

In any telecommunications system, a first party has the ability to contact and communicate with a second party. For example, a calling party has the ability to communicate by placing a voice call to a called party. Similarly, an emailing party has the ability to send an email message to someone else, a text-messaging party has the ability to send a text message to someone else, and so forth.

Each communicating party has the ability to provide alternative treatment for an incoming call or message, in the event that the party is not there, or is otherwise occupied, to respond to the communication attempt. For example, a called party who is not available to receive an incoming voice call may record ahead of time an outgoing voice message to be played for the far-end party who has called. And an emailed party who is not available to respond to a received email may provide ahead of time an away-from-office message to be sent to the far-end party in response to the received email.

SUMMARY OF THE INVENTION

Well-known problems exist with the provision and management of greeting messages. A first problem is that a telecommunications user has to individually administer greetings for each possible communication media format such as voice, text, and video. For example, the user has to prepare a voice recording for unanswered voice calls, an away-from-office message for emails or instant messages that are received while away from the office, and so forth. A second problem is that users who wish to provide greetings that are customized for the day and date have to manually record a day- or date-specific greeting for each customized greeting they want. For example, a user might want a caller to hear that "Today is Monday, and I am here at the office," and would have to record that message along with other customized messages. And a third problem is that users who wish to provide messages that represent the user specifically as busy or out of the office also have to manually record each greeting. For example, a user might want a caller to hear that "I am currently busy on another call" or "I am at a meeting, but will return your call later," and would have to record those messages along with other customized messages. All of these variations in recording the greeting messages can require a considerable amount of time, in order to initially provide all of the greeting messages across all media formats and then to manage and update the set of messages going forward.

The present invention comprises a unified messaging server that enables a telecommunications user to initially enter a greeting message in a single media format such as either voice or text. Subsequently, this greeting message is then used in response to any communication event that arrives for the user, regardless of the media format of the arriving communication event; hence, this greeting message is unified across and applicable to the various types of communication events. A communications event can be a voice call, an email message, a short-message-service (SMS) text message, an instant message, a video call, and so forth. In accordance with the illustrative embodiment, the server—or other type of data-processing system, for that matter—receives arrival notifications of various communication events and, as necessary for each arriving event, generates a greeting message in response to that event and in the same media format as the event itself. In other words, the server represents a previously-prepared outgoing voice or text message i) as a voice message in response to an incoming voice call and ii) as a textual message in response to an email, SMS text message, or instant message. Automatic Speech Recognition can be used to convert a voice message to text, and similarly Text-To-Speech conversion can be used to convert a textual message to voice.

In some embodiments of the present invention, the server enhances an initial, unified greeting by using one or more fields from a user's calendar database. This results in a customized greeting being formed that indicates a user's current whereabouts (e.g., at a meeting, at lunch, on a business trip, on vacation, etc.). The unified greeting that is initialized by the user, in either voice or text format, draws entries directly from the user's calendar database, and in the process inserts day, date, time, or other fields that are specified during the initialization process. This enables the user to tailor the greeting for partial-day absences, which are otherwise often unattended to. Key information such as day, date, event, alternate reach means, and so forth can be provided to the initial, unified greeting without the accompanying need to record multiple full greetings for each calendar entry as is taught in the prior art.

In some additional embodiments, the server accounts for user presence. For example, tracking the user presence is particularly useful for when a user forgets to update her greeting message upon returning to the office from vacation. In this example, a user-presence indication, which can provide an indication as to whether the user is back at the office, can be used to form the customized greeting message accordingly.

The illustrative embodiment of the present invention comprises a method comprising: storing a first greeting message in a first media format; receiving a first arrival notification of a first communication event, the first communication event being in a second media format; and generating a second greeting message in the second media format, the generation of the second greeting message being based on the reception of the first arrival notification, and the content of the second greeting message being based on the first greeting message.

DETAILED DESCRIPTION

For the purposes of this disclosure, the term "communication event" and its inflected forms is defined to include:

i. a voice communication event, including but not limited to a voice telephone call or session, the event being in a voice media format, or ii. a visual communication event, the event being in a video media format or an image-based media format, or iii. a textual communication event, including but not limited to instant messaging, internet relay chat, e-mail, short-message-service, Usenet-like postings, etc., the event being in a text media format, or iv. any combination of i, ii, and iii.

Figure 1:
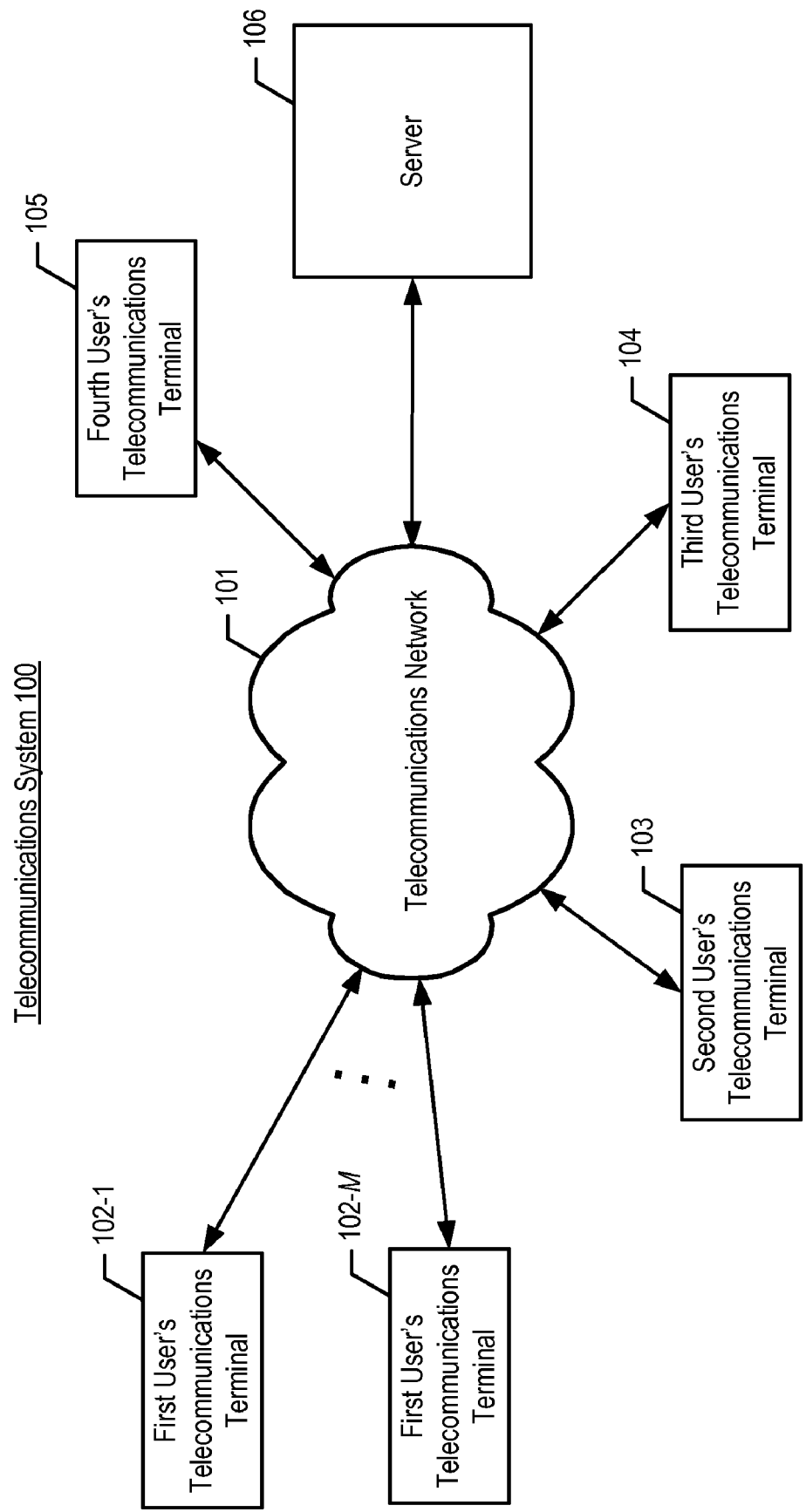
FIG. 1 depicts the salient elements of telecommunications system 100 in accordance with the illustrative embodiment of the present invention.

FIG. 1 depicts the salient elements of telecommunications system 100 in accordance with the illustrative embodiment of the present invention. As shown in FIG. 1, telecommunications system 100 comprises telecommunications network 101; first user's telecommunications terminals 102-1 through 102-M, wherein M is a positive integer greater than one; second user's terminal 103; third user's terminal 104; fourth user's terminal 105; and server 106. The network elements that are depicted in FIG. 1 are interconnected as shown.

Each of telecommunications terminals 102-1 through 102-M, 103, 104, and 105 is capable of handling one or more communications events and is well known in the art. Terminal 102-m, where m has a value between 1 and M, terminal 103, terminal 104, and terminal 105 are associated with a first user, a second user, a third user, and a fourth user, respectively. Although the illustrative embodiment comprises telecommunications terminals for four users, it will be clear to those skilled in the art, after reading this disclosure, how to make and use alternative embodiments of the present invention that comprise terminals for any number of users. And although the illustrative embodiment comprises M telecommunications terminals for the first user and one terminal for each of the second, third, and fourth user, it will be clear to those skilled in the art, after reading this disclosure, how to make and use alternative embodiments of the present invention that comprise any number of terminals for each user, where each user can have the same number of terminals as each other or a different number of terminals from each other.

The telecommunications terminals depicted in FIG. 1 are capable of handling communication events in various media formats such as voice, video, image-based, and text. For pedagogical purposes, terminals 102-1 and 103 are capable of handling voice calls, in which terminal 102-1 is a voice-only cell phone and terminal 103 is a desk set. Meanwhile, terminals 102-2 and 104, which are personal computers, are capable of handling email messages. Lastly, terminal 105, which is a cell phone, is capable of handling both voice and short-message-service (SMS) text messages. As those who are skilled in the art will appreciate, however, other combinations of terminals and of media formats that are handled by those terminals are possible (e.g., a combined voice/video format, a combined image/text format, etc.). In any event, it will be clear to those skilled in the art how to make telecommunications terminals 102-1 through 102-M, 103, 104, and 105.

Server 106 is a data-processing system that is capable of performing the tasks of the illustrative embodiment that are described below and with respect to FIGS. 3 through 5, as well as being capable of receiving and transmitting signals via telecommunications network 101. The components of server 106 are described in detail below and with respect to FIG. 2. In general, server 106 is capable of storing greeting messages, which are provided by the user in a pre-selected media format (e.g., voice, text, video, etc.). In accordance with the illustrative embodiment, server 106 is also capable of generating additional, customized greeting messages from the user-provided, initial greeting message, in response to arrival notifications of communication events.

In some embodiments, server 106 has access to user-schedule databases. The databases comprise the calendar information (e.g., meetings, vacations, etc.) for one or more users, in well-known fashion. As will be appreciated by those skilled in the art, in some embodiments of the present invention this information might be uploaded automatically from calendars stored in the users' telecommunications terminals.

The illustrative embodiment comprises a single server. However, will be clear to those skilled in the art, after reading this disclosure, how to make and use alternative embodiments of the present invention that comprise any number of servers in any topology, in which the overall functionality to be provided can be distributed across multiple servers. For example, in some alternative embodiments, a first server might handle the storage and generation of the greeting messages, while a second server might handle the storage of the calendar information.

Figure 2:
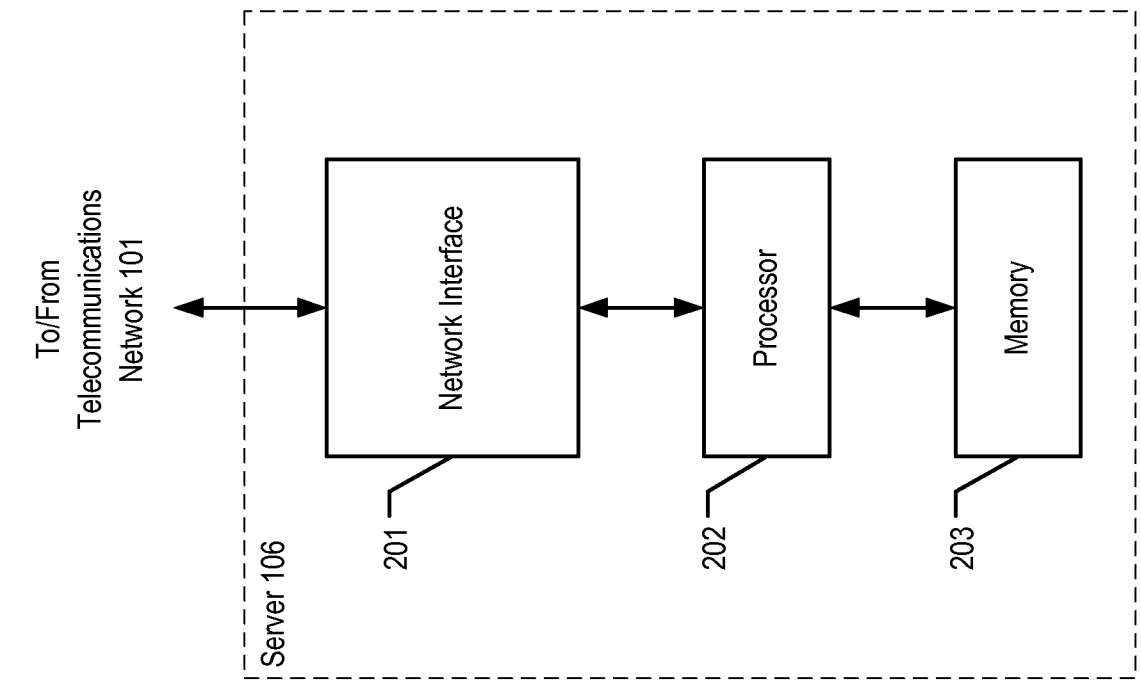
FIG. 2 depicts a block diagram of the salient components of server 106, which exists within system 100.

FIG. 2 depicts a block diagram of the salient components of server 106, in accordance with the illustrative embodiment of the present invention. Server 106 comprises: network interface 201, processor 202, and memory 203, interconnected as shown.

Network interface 201 comprises a receiving part and a transmitting part. The receiving part receives signals from telecommunications network 101, and forwards the information encoded in the signals to processor 202, in well-known fashion. The transmitting part receives information from processor 202, and outputs signals that encode this information to network 101, in well-known fashion. It will be clear to those skilled in the art, after reading this disclosure, how to make and use network interface 201.

Processor 202 is a general-purpose processor that is capable of receiving information from network interface 201, reading data from and writing data into memory 203, executing the tasks described below and with respect to FIGS. 3 through 5, and transmitting information to network interface 201. In some alternative embodiments of the present invention, processor 202 might be a special-purpose processor. Processor 202 may also make use of a special purpose digital signal processor for format conversion from Text To Speech and for Automatic Speech Recognition. In either case, it will be clear to those skilled in the art, after reading this disclosure, how to make and use processor 202.

Memory 203 stores the instructions and data used by processor 202, in well-known fashion, including the greeting messages and schedule information of the illustrative embodiment as described above. Memory 203 can be any combination of dynamic random-access memory (RAM), flash memory, disk drive memory, and so forth. It will be clear to those skilled in the art, after reading this disclosure, how to make and use memory 203.

Figure 3:
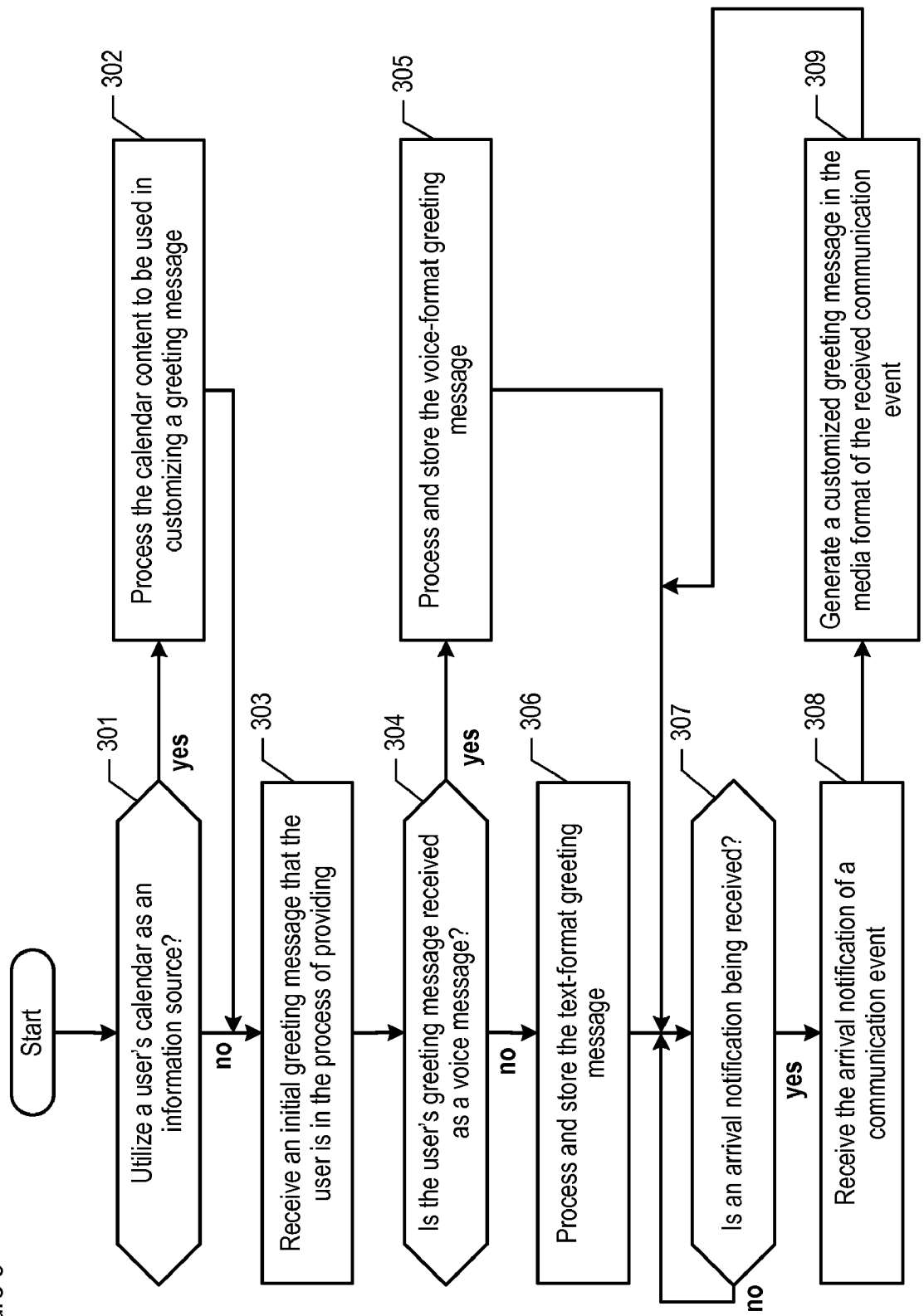
FIG. 3 depicts a flowchart of the overall salient tasks as performed by server 106, in accordance with the illustrative embodiment of the present invention.
Figure 4:
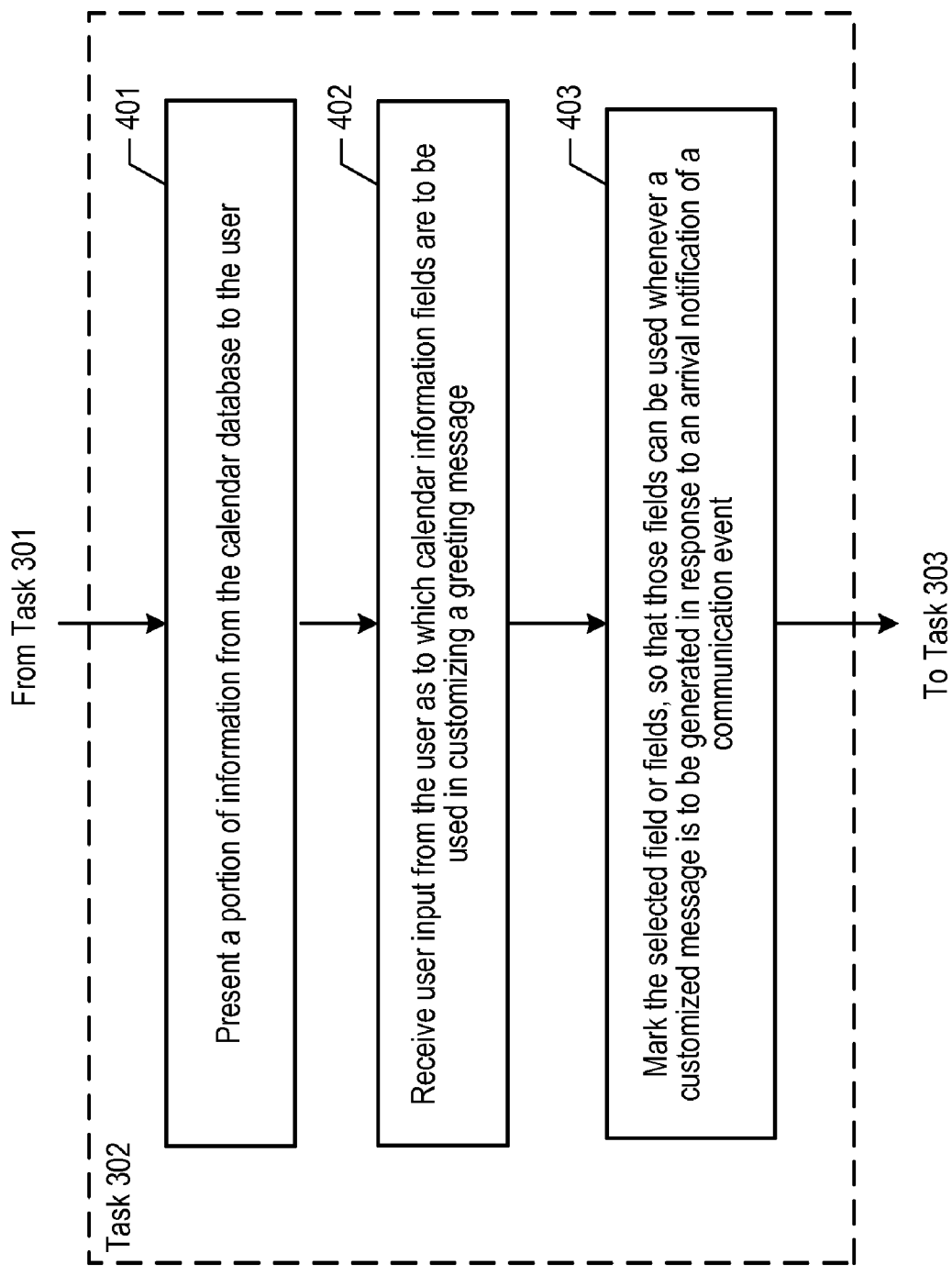
FIG. 4 depicts a flowchart of the salient tasks that are related to the processing of the calendar content performed at task 302.
Figure 5:
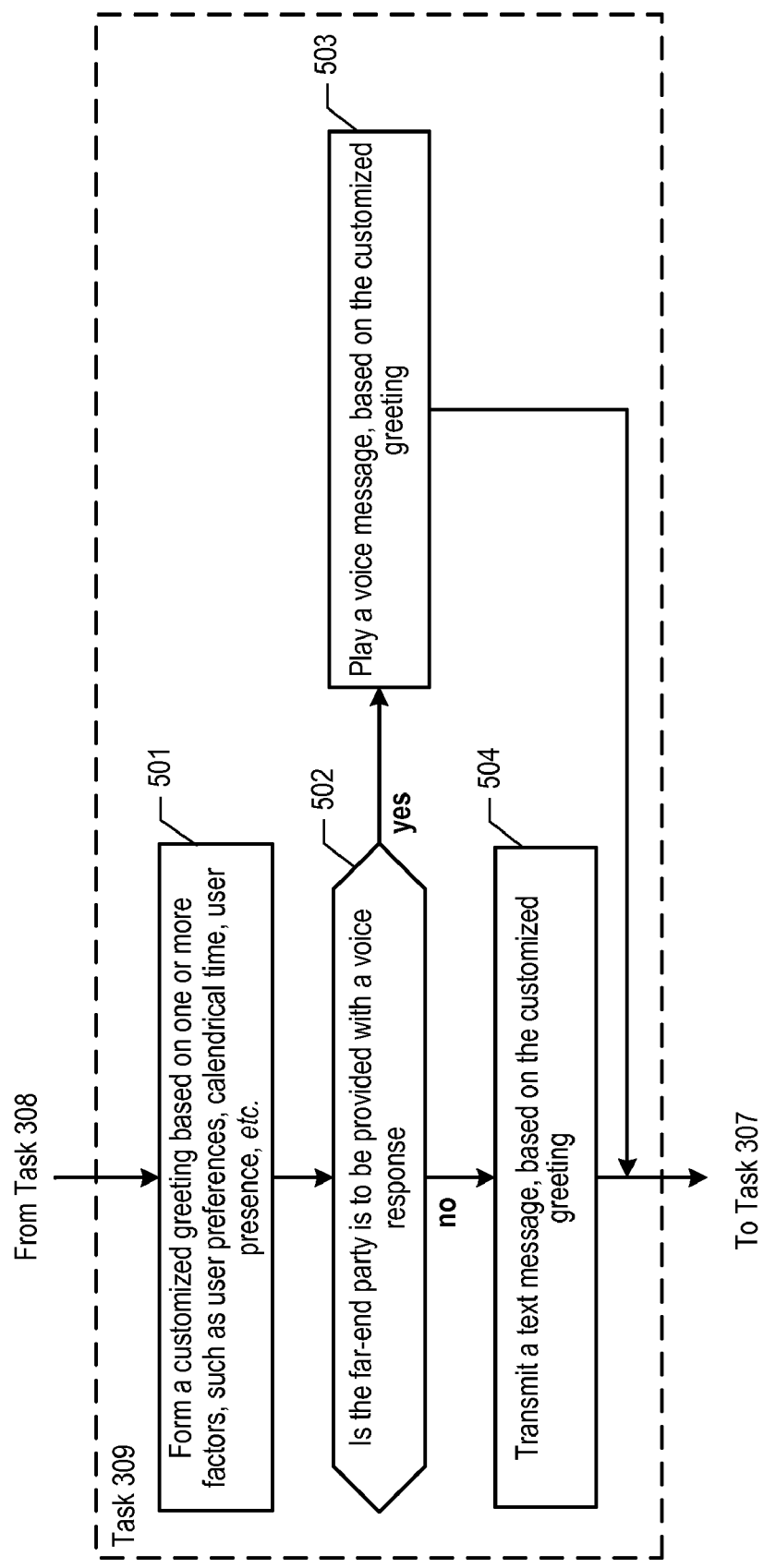
FIG. 5 depicts a flowchart of the salient tasks that are related to the generation of the greeting message performed at task 309.

FIGS. 3 through 5 depict flowcharts of the salient tasks as performed by server 106, in accordance with the illustrative embodiment of the present invention. As those who are skilled in the art will appreciate, in some alternative embodiments, only a subset of the depicted tasks is performed. In some other alternative embodiments, at least some of the tasks are performed simultaneously or in a different order from that depicted.

For pedagogical purposes, terminals 102-1 and 102-2 are featured as terminals that are able to handle voice communication and email communication, respectively, as described above and with respect to FIG. 1. Therefore, terminal 102-1 enables a particular user to access server 106 via a voice communication event, in order to provide and store a voice message as a greeting. Similarly, terminal 102-2 enables the user to access server 106 via a text communication event, in order to provide and store a textual message as a greeting. In the tasks that follow, terminals 102-1 and 102-2 receive arrival notifications of communication events that are intended for the user of the two terminals, from other terminals such as terminals 103, 104, and 105.

In accordance with the illustrative embodiment, media formats of voice and text are described with respect to the various tasks. However, it will be clear to those skilled in the art, after reading this specification, how to make and use alternative embodiments in which other media formats are handled, where each of which is characterized by a single medium (e.g., video, image, etc.) or is characterized by a combination of media (e.g., a combined voice/video format, a combined image/text format, etc.). For example, in some alternative embodiments, server 106 can receive an initial greeting message provided by the user in a combined voice/video media format and generate a customized greeting message in another format such as text-only, text/video, text/image, and so forth.

Although server 106 is portrayed as providing the unified greeting service to a single set of terminals for a particular user, it will be clear to those skilled in the art, after reading this specification, how to make and use alternative embodiments in which server 106, or another data-processing system for that matter, provides the unified greeting service to the terminals of multiple users concurrently.

Referring now to FIG. 3, at task 301 server 106 determines whether to use the user's calendar database as an information source for customizing a greeting to be provided by the user. For example, the server 106 can query the user to determine if the calendar database is to be used. If the calendar database is to be used, task execution proceeds to task 302. Otherwise, task execution proceeds to task 303.

At task 302, server 106 processes the calendar database's content that is to be used in customizing the greeting. The salient subtasks of task 302 are described below and with respect to FIG. 4.

At task 303, server 106 receives a greeting message that the user is in the process of providing, either as a voice message (e.g., from terminal 102-1, etc.) or as a textual message (e.g., from terminal 102-2, etc.).

At task 304, if the greeting message received at task 303 is a voice message, task execution proceeds to task 305. If the greeting message received at task 303 is a text message, task execution proceeds to task 306.

At task 305, server 106 processes and stores the voice-format greeting message. The processing comprises, in some embodiments, a training phase in which the system guides the user through recording spoken words and phrases, as well as possible various vocal inflections for use by the calendar. If the server was configured to include information fields from the calendar and the content of those fields have not been already recorded, server 106 prompts the user to speak the word or phrase that corresponds to those fields. In some embodiments, server 106 previously prompted the user to speak the word or phrase whenever the user entered the particular calendar information (e.g., an appointment, an event, etc.) that is now being considered as part of a customized greeting message. Task execution then proceeds to task 307.

At task 306, server 106 processes and stores the text-format greeting message. The processing comprises prompting the user for one or more basic greetings with fields within the greeting in which text from the user's calendar would be placed for customization of day, date, and so forth.

At task 307, server 106 waits for arrival notifications of communication events (e.g., phone calls, emails, etc.).

At task 308, server 106 receives an arrival notification of a communication event. The event, for example, can be in a voice media format or in a text media format. As those who are skilled in the art will appreciate, in some embodiments server 106 continually receives arrival instances of communications events that are in a variety of different media formats. For example, the server might receive an arrival notification of a voice call in a first instance (e.g., from terminal 105, etc.), followed by a notification of an email second (e.g., from terminal 104, etc.), followed by a notification of a SMS text message third (e.g., from terminal 105, etc.), followed by a notification of another voice call fourth (e.g., from terminal 103, etc.), and so on.

At task 309, server 106 generates a greeting message in the media format that matches the media format of the arriving communication event. The salient subtasks of task 309 are described below and with respect to FIG. 5. The generation of the greeting is based on the reception of the arrival notification at task 308. The content of the generated greeting message is based on the greeting message left by the user at task 303. Task execution then proceeds back to task 307, in order to await the next arrival notification for the next communication event.

FIG. 4 depicts a flowchart of the salient tasks that are related to the processing of the calendar content performed at task 302.

At task 401, server 106 presents a portion of information from the calendar database to the user. For example, server 106 displays part of the calendar based on some initial selections by the user.

At task 402, in response to presenting the portion of the calendar, server 106 receives user input as to which information fields in the user's calendar database are to be used in generating a customized greeting message. For example, the day, date, time, alternate reach means, and/or other fields in the calendar database can be specified by the user.

At task 403, server 106 marks the selected field or fields as user preferences, so that those marked fields can be used in the future whenever a customized greeting message is to be generated in response to an arrival notification of a communication event (e.g., voice call, email, etc.). Task execution then proceeds to task 303.

FIG. 5 depicts a flowchart of the salient tasks that are related to the generation of the greeting message performed at task 309. As those who are skilled in the art will appreciate, server 106 is able to take a unified, initial greeting message that has been stored in either voice or text format and generate a customized greeting message in either text or voice format.

At task 501, server 106 forms a customized greeting message based on one or more factors such as, but not limited to, user preferences (e.g., the selected calendar database fields marked at task 403, etc.), calendrical time, user presence, and so forth. For example, tracking the user presence is particularly useful for when a user forgets to update her greeting message upon returning to the office from vacation. In this example, a user-presence indication, which can provide an indication as to whether the user is back at the office, can be used to form the customized greeting message accordingly.

At task 502, if the far-end party of the communication event is to be provided with a voice response, task execution proceeds to task 503. If the far-end party is to get a text response, task execution proceeds to task 504.

At task 503, server 106 plays a voice message to the far-end party of the received communication event. If the original greeting message was stored in text format at task 306, server 106 invokes a text-to-speech engine to generate the voice greeting that is equivalent to the customized greeting message formed at task 501. Task execution then proceeds to task 307 to await another communication event.

At task 504, server 106 transmits a text message to the far-end party of the received communication event. If the original greeting message was stored in voice format at task 305, server 106 invokes a speech-recognition engine to generate the text greeting that is equivalent to the customized greeting message formed at task 501.

In some embodiments, if the original greeting message was stored in voice format, server 106 creates a computer file that conveys the customized greeting message in voice format, where the computer file is in a suitable storage format such as *.mp3, *.aac, or *.wav. Server 106, in some embodiments, then transmits the computer file to the far-end party as an attachment to a textual message such as email or an SMS text message.

Task execution then proceeds to task 307 to await another communication event.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   storing a first greeting message in a first media format;
   receiving a first arrival notification of a first communication event;
   determining, in response to receiving the first arrival notification, that the first communication event is in a second media format different from the first media format; and
   in response to the determining step, generating a second greeting message in the second media format,
   wherein content of the second greeting message is based on content of the first greeting message.

2. The method of claim 1 wherein the first media format is text and the second media format is voice.

3. The method of claim 2 wherein the content of the second greeting message is also based on a presence indication that pertains to a user.

4. The method of claim 1 wherein the first media format is voice and the second media format is text.

5. The method of claim 4 further comprising:
   receiving a first spoken phrase from a user, wherein the first spoken phrase corresponds to a predetermined information field of a calendar database for the user;
   wherein the content of the second greeting message is also based on the first spoken phrase.

6. The method of claim 5 wherein the content of the second greeting message is also based on a presence indication that pertains to the user.

7. The method of claim 5 further comprising:
   presenting, to the user, a portion of information from the calendar database; and
   receiving, from the user, a selection of the predetermined information field, in response to the presentation to the user and prior to the receiving of the first spoken phrase.

8. The method of claim 1 further comprising:
   receiving a second arrival notification of a second communication event, wherein the second communication event is in the first media format; and
   generating a third greeting message in the first media format, the generation of the third greeting message being based on the reception of the second arrival notification, and the content of the third greeting message being based on the first greeting message.

9. The method of claim 8 wherein one of the first and second media formats is text and the other of the first and second media formats is voice.

10. The method of claim 1 wherein one of the first and second media formats comprises video and the other of the first and second media formats is a media format in which video is not included.

11. A method comprising:
    storing a first greeting message in a first media format;
    receiving a first arrival notification of a first communication event;
    in response to receiving the first arrival notification, determining that the first communication event is in a second media format different from the first media format; and
    in response to determining that the first communication event is in a second media format different from the first media format, generating a second greeting message in the second media format,
    wherein content of the second greeting message is based on content of the first greeting message, and
    wherein the first communication event is one of a visual communication event and a voice communication event.

12. The method of claim 11 further comprising:
    generating a third greeting message in voice format, wherein the generation of the third greeting message is based on the reception of an arrival indication that corresponds to a second communication event, and wherein the content of the third greeting message is based on the first greeting message.

13. The method of claim 12 further comprising:
    generating a fourth greeting message in voice format, wherein the generation of the fourth greeting message is based on the reception of an arrival indication that corresponds to a third communication event, wherein the content of the fourth greeting message is based on the first greeting message; and
    creating a computer file that conveys the fourth greeting message.

14. The method of claim 13 further comprising transmitting the computer file to the originator of the third communication event.

15. The method of claim 14 wherein the computer file is transmitted as an attachment to a textual message.

16. A method comprising:
    storing a first greeting message in a first media format;
    receiving a first arrival notification of a first communication event, the first communication event being in a second media format; and
    generating a second greeting message in the second media format, the generation of the second greeting message being based on the reception of the first arrival notification, and content of the second greeting message being based on content of the first greeting message,
    wherein one of the first and second media formats comprises video and the other of the first and second media formats is a media format in which video is not included.

17. The method of claim 16 wherein the content of the second greeting message is also based on a presence indication that pertains to a user.

* * * * *